(12) United States Patent
 Kleiner et al.

(10) Patent No.: US 12,515,978 B2
(45) Date of Patent: Jan. 6, 2026

(54) METHOD FOR SEPARATING ULTRATHIN GLASS

(71) Applicant: TRUMPF Laser—und Systemtechnik GmbH, Ditzingen (DE)

(72) Inventors: Jonas Kleiner, Leonberg (DE); Daniel Flamm, Ludwigsburg (DE); Marcel Schaefer, Burladingen (DE); Myriam Kaiser, Heimsheim (DE); Michael Jenne, Ditzingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 291 days.

(21) Appl. No.: 18/181,589

(22) Filed: Mar. 10, 2023

(65) Prior Publication Data

US 2023/0271872 A1    Aug. 31, 2023

Related U.S. Application Data

(63) Continuation of application No. PCT/EP2021/072964, filed on Aug. 18, 2021.

(30) Foreign Application Priority Data

Sep. 11, 2020  (DE) .................... 10 2020 123 786.3

(51) Int. Cl.
  *C03B 33/02* (2006.01)
  *B23K 26/00* (2014.01)
  (Continued)

(52) U.S. Cl.
  CPC ...... *C03B 33/0222* (2013.01); *B23K 26/0006* (2013.01); *B23K 26/0624* (2015.10);
  (Continued)

(58) Field of Classification Search
  CPC ............ B23K 2103/54; B23K 26/0006; B23K 26/06; B23K 26/0624; B23K 26/0665;
  (Continued)

(56) References Cited

U.S. PATENT DOCUMENTS

2017/0189991 A1    7/2017    Gollier et al.
2017/0252859 A1    9/2017    Kumkar et al.
(Continued)

FOREIGN PATENT DOCUMENTS

DE        102019205394 A1    10/2020
KR         20190057278 A      5/2019
WO       WO 2016079275 A1     5/2016

OTHER PUBLICATIONS

Keyou Chen et al., "Generalized axicon-based generation of nondiffracting beams," arxiv, Nov. 2019, pp. 1-4, Conrell University Ithaca, NY,USA.
(Continued)

*Primary Examiner* — Ibrahime A Abraham
*Assistant Examiner* — Joseph W Iskra
(74) *Attorney, Agent, or Firm* — LEYDIG, VOIT & MAYER, LTD.

(57) ABSTRACT

A method for separating an ultrathin glass using ultrashort laser pulses of an ultrashort pulse laser includes focusing the ultrashort laser pulses into the ultrathin glass such that a resulting focal zone is elongated in a beam direction and extends over an entire thickness of the ultrathin glass. The ultrashort laser pulses have a non-radially symmetric beam cross section perpendicular to a beam propagation direction. The method further includes introducing material modifications into the ultrathin glass along a separating line using the ultrashort laser pulses focused into the ultrathin glass, and separating the ultrathin glass along the separating line.

14 Claims, 10 Drawing Sheets

(51) Int. Cl.
*B23K 26/06* (2014.01)
*B23K 26/0622* (2014.01)
*B23K 26/073* (2006.01)
*B23K 26/53* (2014.01)
*B23K 103/00* (2006.01)
*C03B 33/04* (2006.01)

(52) U.S. Cl.
CPC ...... *B23K 26/0665* (2013.01); *B23K 26/0736* (2013.01); *B23K 26/53* (2015.10); *C03B 33/04* (2013.01); *B23K 2103/54* (2018.08)

(58) Field of Classification Search
CPC ................ B23K 26/0736; B23K 26/53; C03B 33/0222; C03B 33/04
USPC ...................................................... 219/121.6
See application file for complete search history.

(56) References Cited

U.S. PATENT DOCUMENTS

| | | |
|---|---|---|
| 2017/0259375 A1 | 9/2017 | Kumkar et al. |
| 2017/0276951 A1 | 9/2017 | Kumkar et al. |
| 2018/0093914 A1* | 4/2018 | Akarapu ............ B23K 26/0608 |
| 2019/0119150 A1* | 4/2019 | Burket ................ C03C 23/0025 |
| 2019/0283178 A1 | 9/2019 | Mishchik et al. |
| 2022/0032398 A1 | 2/2022 | Kumkar et al. |

OTHER PUBLICATIONS

Myriam Kaiser, "The solution for separating ultra-thin display glass with high bendability," Jul. 2019, pp. 1-4, Trumpf SE+ Co. KG, Ditzingen, Germany.

* cited by examiner

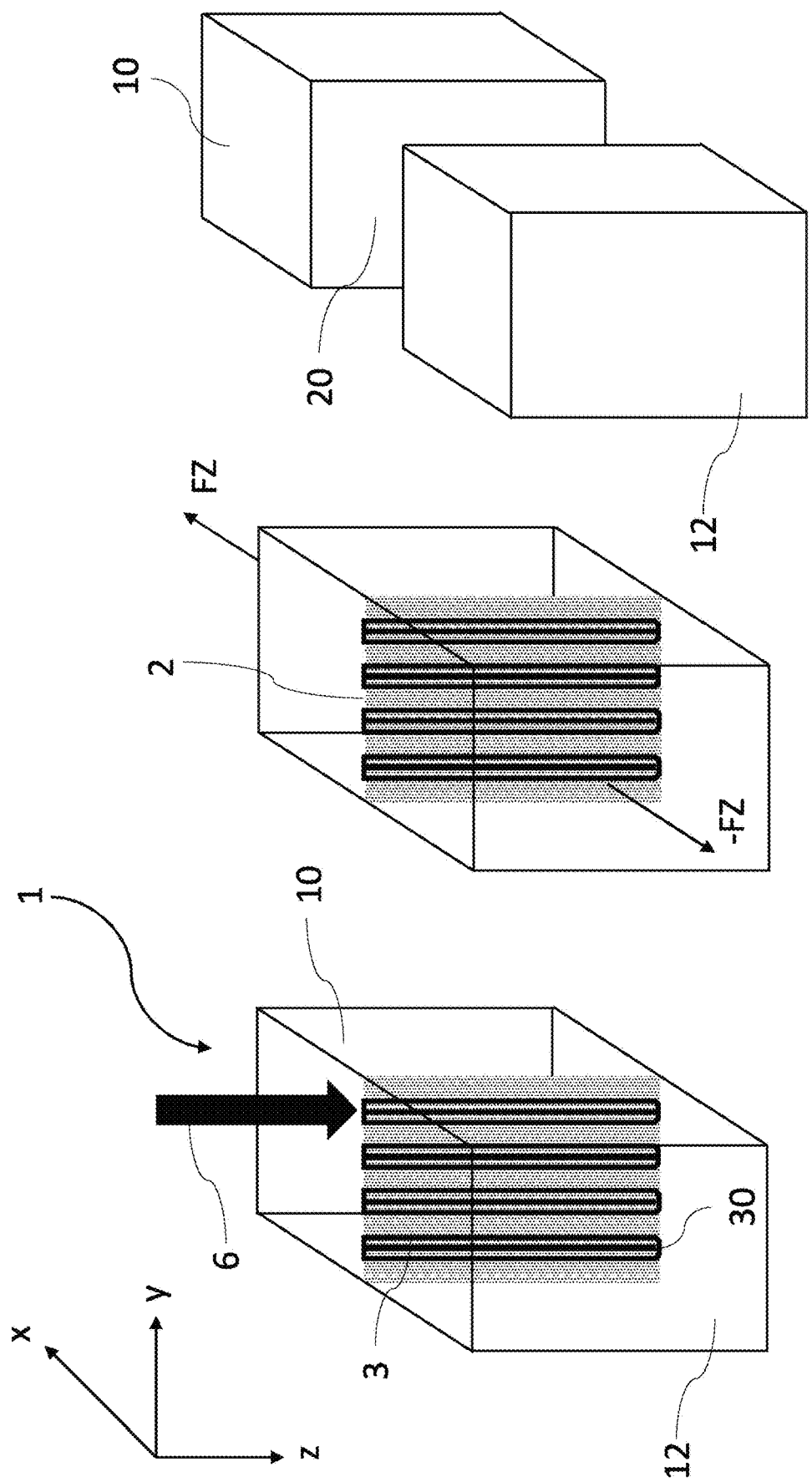

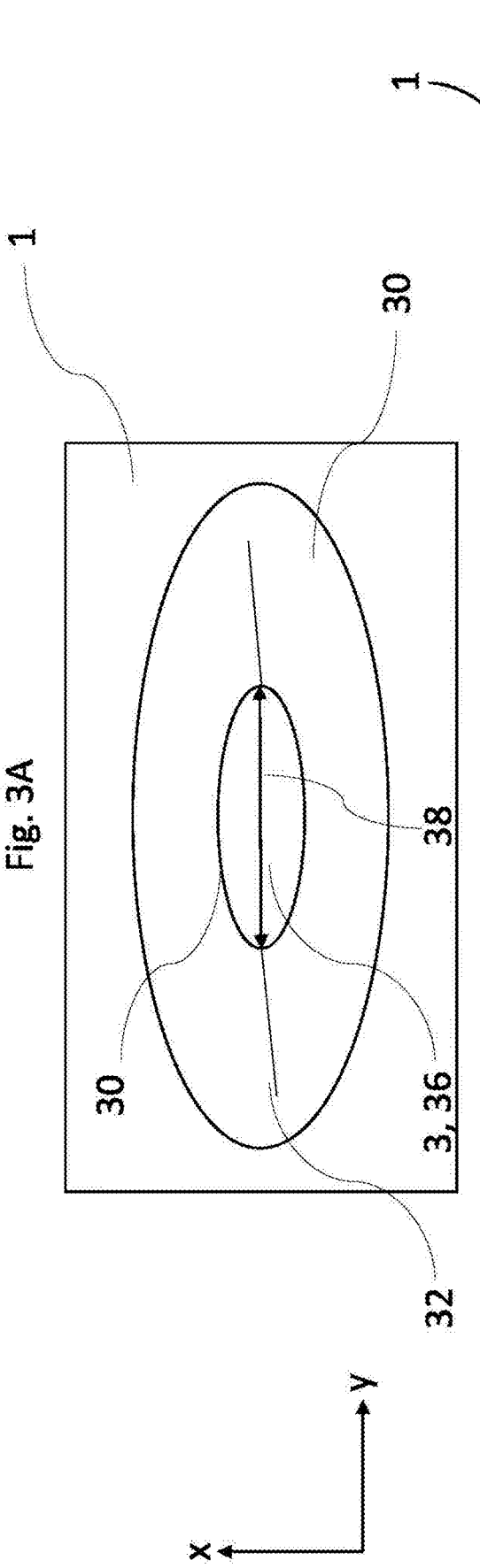
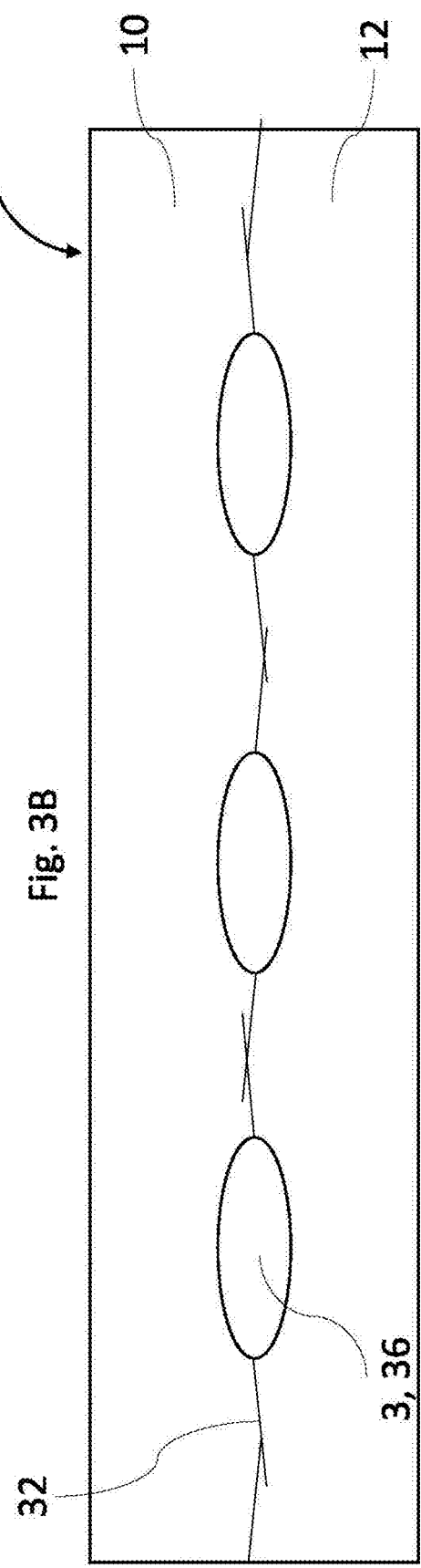

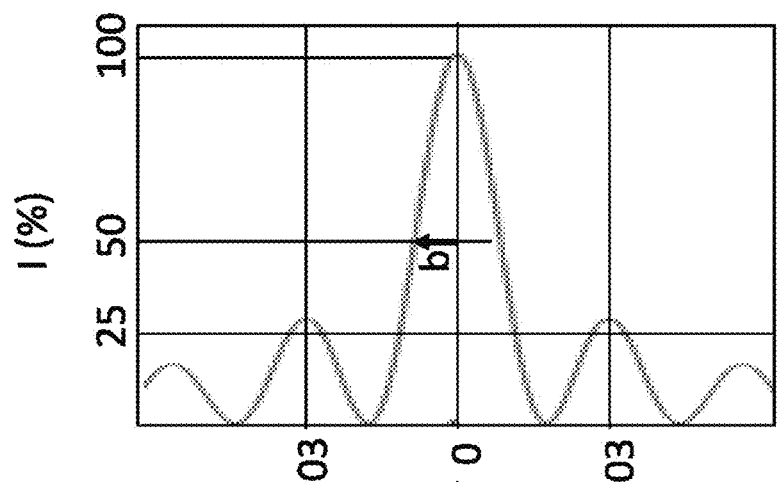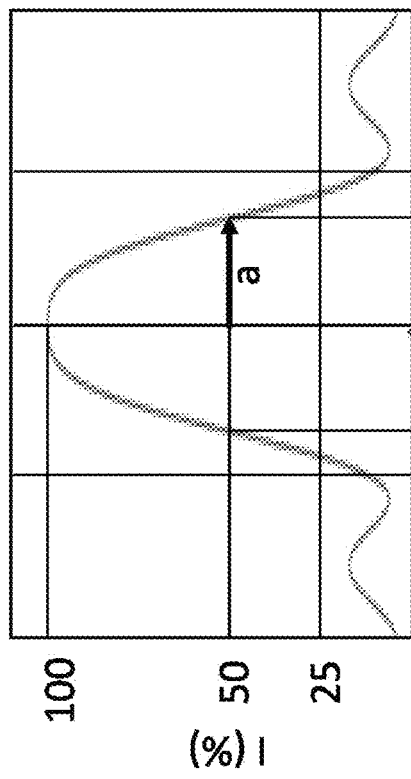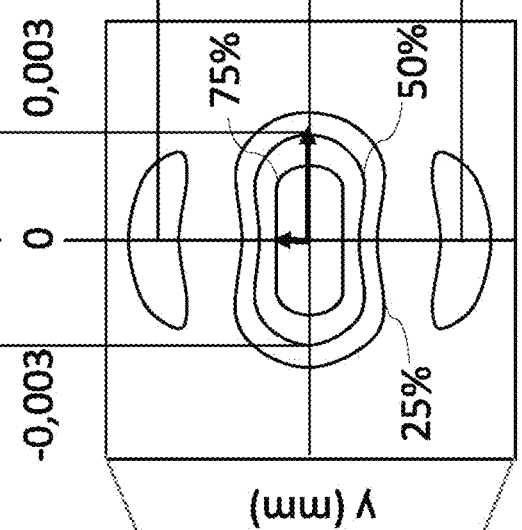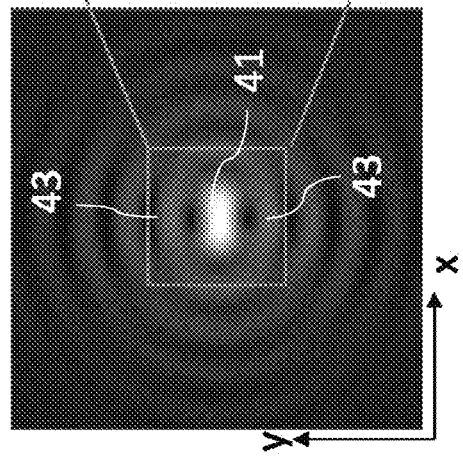

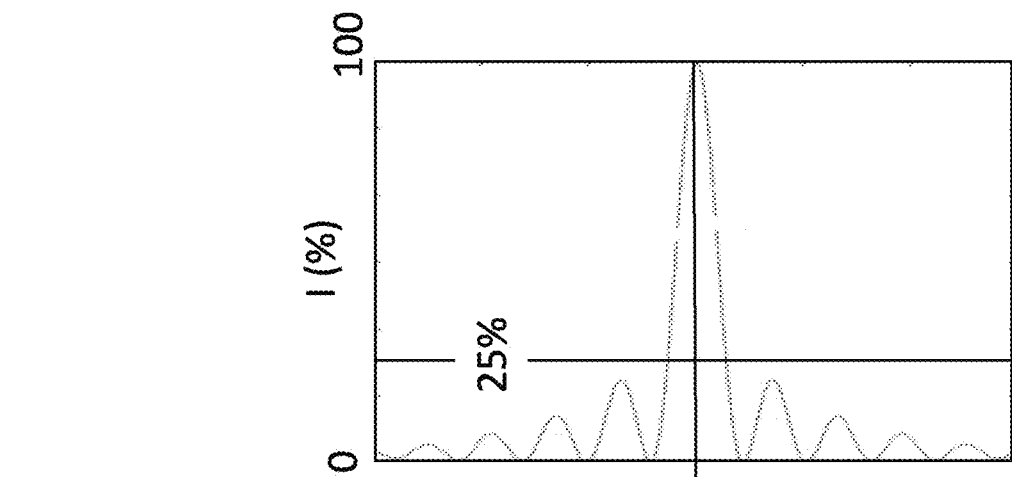
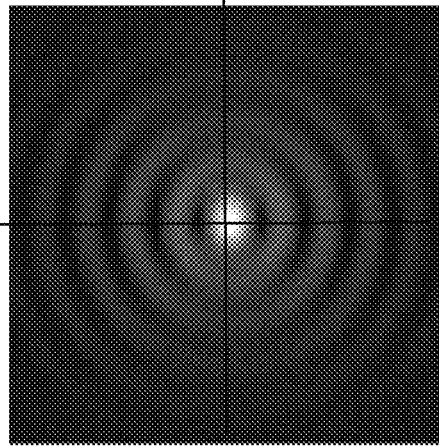
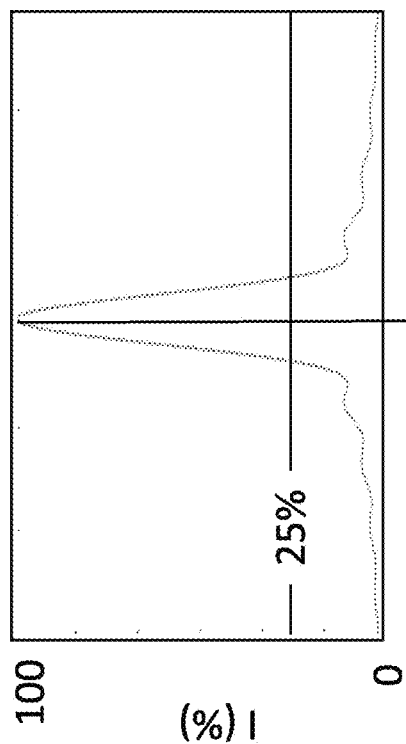

METHOD FOR SEPARATING ULTRATHIN GLASS

CROSS REFERENCE TO RELATED APPLICATIONS

This application is a continuation of International Application No. PCT/EP2021/072964 (WO 2022/053275 A1), filed on Aug. 18, 2021, and claims benefit to German Patent Application No. DE 10 2020 123 786.3, filed on Sep. 11, 2020. The aforementioned applications are hereby incorporated by reference herein.

FIELD

Embodiments of the present invention relate to a method for separating ultrathin glass and to a device for carrying out the method.

BACKGROUND

It is known that separating ultrathin glass on the basis of laser pulses represents a particular technical challenge—particularly if the material properties of the separated glass produced are intended to be influenced as little as possible by the separating process.

For the separation of glass, use has hitherto been made of laser pulses, in order to introduce predetermined breaking points into the glass which then together form the desired separating line. This introduction of the predetermined breaking points is followed by a separating step, which is carried out, for example, by applying a thermal stress and/or by applying a mechanical stress, preferably a tensile stress or bending stress, and/or by etching by means of at least one wet-chemical solution.

In order to be able to separate ultrathin glass, stable crack propagation between the introduced predetermined breaking points is required. The thinner the material, the more difficult it is to implement a stable separating process.

SUMMARY

Embodiments of the present invention provide a method for separating an ultrathin glass using ultrashort laser pulses of an ultrashort pulse laser. The method includes focusing the ultrashort laser pulses into the ultrathin glass such that a resulting focal zone is elongated in a beam direction and extends over an entire thickness of the ultrathin glass. The ultrashort laser pulses have a non-radially symmetric beam cross section perpendicular to a beam propagation direction. The method further includes introducing material modifications into the ultrathin glass along a separating line using the ultrashort laser pulses focused into the ultrathin glass, and separating the ultrathin glass along the separating line.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic illustration of the separating method according to some embodiments;

FIGS. 3A and 3B show a schematic detail view of the material modification and of the crack propagation according to some embodiments;

FIGS. 6A, 6B, 6C, and 6D show a detailed analysis of an elliptical beam cross section according to some embodiments;

FIGS. 8A, 8B, and 8C show a detailed analysis of a further elliptical beam cross section according to some embodiments;

DETAILED DESCRIPTION

Figure 2A:
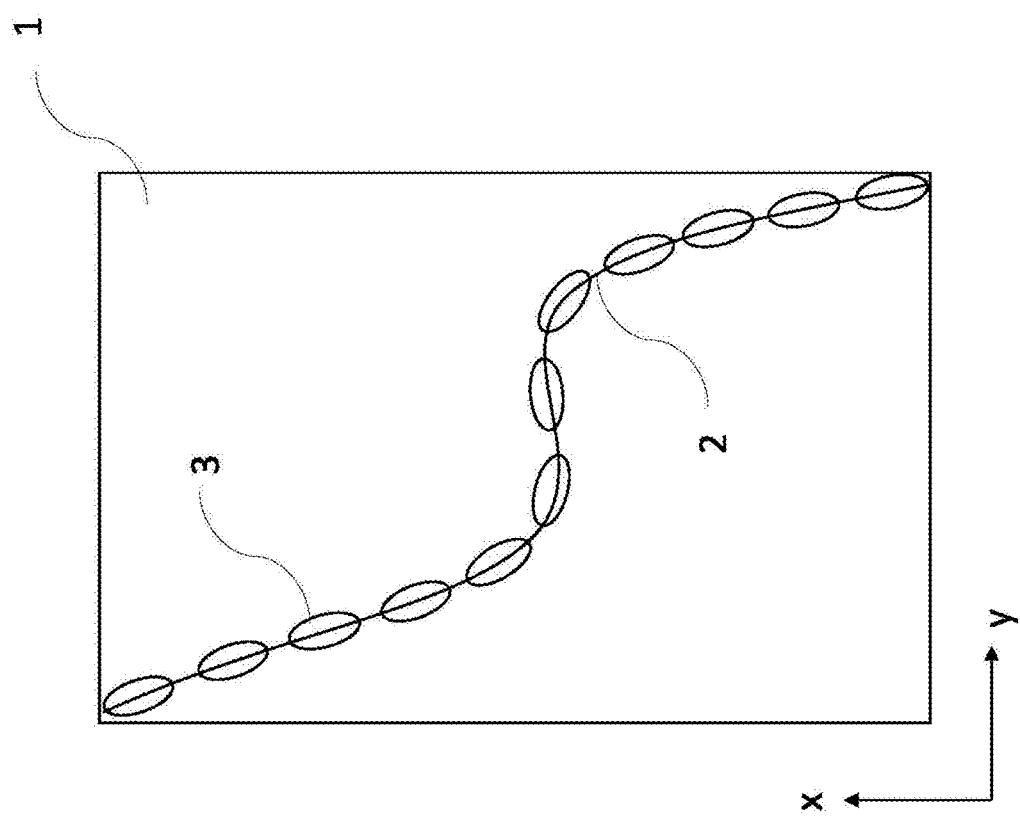
FIGS. 2A and 2B show a further schematic illustration of the separating method according to some embodiments.

Embodiments of the present invention provide a method for separating ultrathin glass, wherein material modifications are introduced into the ultrathin glass along a separating line by means of ultrashort laser pulses of an ultrashort pulse laser and the ultrathin glass is then separated along the separating line in a separating step. According to embodiments of the invention, the ultrashort laser pulses are focused into the ultrathin glass such that the resulting focal zone, which is elongated in a beam direction, extends over the entire thickness of the ultrathin glass and the ultrashort laser pulses have a non-radially symmetric beam cross section perpendicular to the beam propagation.

Ultrathin glass generally refers to a glass or a material which is largely transparent to the laser light used having a thickness of less than 1000 µm, preferably less than 300 µm, particularly preferably less than 100 µm, for example having a thickness of 100 µm, 50 µm, 30 µm or 10 µm.

In this case, the ultrathin glass may be, for example, borosilicate glass, aluminoborosilicate glass, aluminosilicate glass or else quartz glass, a transparent ceramic, sapphire or a glass ceramic. In the following text, the terms ultrathin glass and glass are always used synonymously.

An ultrashort pulse laser makes available the ultrashort laser pulses. Ultrashort laser pulses are understood to mean pulses in the picosecond range or in the femtosecond range.

The laser may also make available pulse trains, what are known as bursts, composed of ultrashort laser pulses, each burst comprising the emission of a plurality of laser pulses. In this case, it is in particular also possible to provide what are known as GHz bursts.

The ultrashort laser pulses move over the ultrathin glass along a trajectory determined by an optical unit of the laser, the trajectory following the desired separating line. The laser beam formed by the laser pulses and the glass may in this case be moved relative to one another with a feed, in order to correspondingly achieve the introduction of the material modifications along the separating line.

The laser beams formed by the laser pulses may in this case be quasi non-diffractive beams, at least in the focal zone elongated in the beam direction. Non-diffractive beams satisfy the Helmholtz equation:

$$\nabla^2 U(x,y,z) + k^2 U(x,y,z) = 0$$

and have a clear separability into a transverse and a longitudinal dependence of the form $$U(x,y,z) = U_t(x,y) \exp(ik_z z)$$

In this case, k=ω/c is the wave vector with its transverse and longitudinal components $k^2 = k_z^2 + k_t^2$, and $U_t(x,y)$ is an arbitrary complex-valued function that is dependent only on the transverse coordinates x, y. The z-dependence in the beam propagation direction in U(x,y,z) leads to a pure phase modulation, with the result that the associated intensity I of the solution is propagation-invariant or non-diffractive:

$$I(x,y,z) = |U(x,y,z)|^2 = I(x,y)$$

This approach provides different classes of solutions in different coordinate systems, for example Mathieu beams in elliptic-cylindrical coordinates or Bessel beams in circular-cylindrical coordinates.

Experimentally it is possible to realize a multiplicity of non-diffractive beams in a good approximation, that is to say quasi non-diffractive beams. In contrast to the theoretical construct, these merely carry finite power. Just as finite is the length L of the propagation invariance of these quasi non-diffractive beams.

On the basis of the standard for laser beam characterization ISO 11146 1-3, the beam diameter is determined by way of what are known as 2nd moments. In this case, the power of the laser beam or the 0th order moment is defined as:

$$P = \int dx\, dy\, I(x,y).$$

The spatial 1st order moments specify the centroid of the intensity distribution and are defined as:

$$\langle x \rangle = \frac{1}{P} \int dx\, dy\, x\, I(x,y),$$

$$\langle y \rangle = \frac{1}{P} \int dx\, dy\, y\, I(x,y).$$

On the basis of the equations above, it is possible to calculate the spatial moments of the 2nd order of the transverse intensity distribution:

$$\langle x^2 \rangle = \frac{1}{P} \int dx\, dy\, (x - \langle x \rangle)^2 I(x,y),$$

$$\langle y^2 \rangle = \frac{1}{P} \int dx\, dy\, (y - \langle y \rangle)^2 I(x,y),$$

$$\langle xy \rangle = \frac{1}{P} \int dx\, dy\, (x - \langle x \rangle)(y - \langle y \rangle) I(x,y).$$

Using the thus completely defined spatial moments of 2nd order of the laser beam, it is possible to determine the beam diameters in the principal axes. In this case, the principal axes are the directions of minimum and maximum extent of the transverse beam profile and these always run orthogonal to one another. Then, the beam diameter d of the laser beam arises as follows:

$$d_x = 2\sqrt{2} \left\{ ((\langle x^2 \rangle) + \langle y^2 \rangle) + \gamma[((\langle x^2 \rangle) - \langle y^2 \rangle)^2 + 4(\langle xy \rangle)^2]^{\frac{1}{2}} \right\}^{\frac{1}{2}},$$

-continued $$d_y = 2\sqrt{2} \left\{ ((\langle x^2 \rangle) + \langle y^2 \rangle) - \gamma[((\langle x^2 \rangle) - \langle y^2 \rangle)^2 + 4(\langle xy \rangle)^2]^{\frac{1}{2}} \right\}^{\frac{1}{2}},$$

with $$\gamma = \frac{\langle x^2 \rangle - \langle y^2 \rangle}{|\langle x^2 \rangle - \langle y^2 \rangle|}.$$

The focal zone $d^{GF}_{x,y}$ of a Gaussian beam, the Gaussian focus, or the diameter of the Gaussian beam or Gaussian profile is defined by way of the second moments, that is to say the variance of the Gaussian curve, and the associated characteristic length, the Rayleigh length $z_R = \pi(d^{GF}_{x,y})^2/4\lambda$, is defined as the distance starting from the focal position at which the beam cross section has increased by a factor of 2. In the case of a symmetric Gaussian beam, the following applies to the focal zone: $d^{GF}_0 = d^{GF}_x = d^{GF}_y$.

Furthermore, as transverse focal diameter in the case of quasi non-diffractive beams $d^{ND}_0$, the transverse dimensions of local intensity maxima are defined as twice the shortest distance between an intensity maximum and an intensity decrease to 25% proceeding therefrom.

The longitudinal extent of the focal zone in the beam propagation direction of these almost propagation-invariant intensity maxima gives the characteristic length L of the quasi non-diffractive beam. This characteristic length is defined by way of the intensity decrease to 50%, proceeding from the local intensity maximum in a positive and negative z-direction, that is to say in the propagation direction.

A quasi non-diffractive beam is present exactly if for $d^{ND}_0 \approx d^{GF}_{x,y}$, that is to say similar transverse dimensions, the characteristic length L distinctly exceeds the Rayleigh length of the associated Gaussian focus, for example if $L > 10 z_R$.

By focusing the laser beam or the ultrashort laser pulses into the ultrathin glass, a focal zone is provided which extends over the entire thickness of the ultrathin glass. In this case, the focal zone extends in the propagation direction of the laser pulses and is elongated, that is to say lengthened in the propagation direction.

By virtue of the fact that the focal zone extends over the entire thickness of the ultrathin glass, each of the necessary material modifications can be generated in the ultrathin glass by means of a single laser pulse or a single burst. In other words, each material modification is introduced immediately throughout the entire thickness of the ultrathin glass, such that no further machining is required at the same position in order to introduce the material modification.

The ultrashort laser pulses may have a non-radially symmetric beam cross section perpendicular to the propagation direction. A non-radially symmetric beam cross section is present in particular if $d_x$ is not equal to $d_y$, $d_x$ and $d_y$ being defined by way of the second moments of a transverse intensity distribution. In order to calculate the second moments, in particular only intensity values of the intensity distribution which lie within a curve of identical intensity are taken into account, the curve encompassing a local and/or global maximum of the intensity distribution. In particular, the intensity is 40% and in particular 60% of the maximum intensity of the local and/or global maximum.

Preferably, the non-radially symmetric beam cross section is in the form of an elliptical beam cross section, for example $d_x/d_y = 1.5$.

The laser beam may have an enveloping non-radially symmetric beam cross section perpendicular to the beam propagation direction. An enveloping non-radially symmetric beam cross section is present in particular if $d_x$ is not equal to $d_y$, $d_x$ and $d_y$ being defined by way of the second moments of a transverse intensity distribution of the laser beam. In order to calculate the second moments, in particular only intensity values of the intensity distribution which lie above an intensity threshold are taken into account. By way of example, the intensity threshold is 17% of the maximum intensity of the global maximum of the intensity distribution.

However, a non-radially symmetric beam cross section may also mean that the beam cross section is, for example, of cross-like form or is triangular or is polygonal, for example is pentagonal. A non-radially symmetric beam cross section may also comprise further rotationally symmetric and mirror-symmetric beam cross sections.

The laser beam with non-radially symmetric cross section is preferably a non-diffractive laser beam.

In particular, the contours of the beam cross sections have locations with different curve radii. By way of example, in the case of an elliptical beam cross section, the curve radius at the point at which the small half-axis intersects the ellipse is particularly great, while the curve radius at the point at which the large half-axis intersects the ellipse is particularly small.

The laser pulse or the laser pulses are at least partially absorbed by the glass material of the ultrathin glass, with the result that the ultrathin glass is heated locally. In this case, the size of the heated region is determined by the beam geometry, in particular by the focal zone of the laser beam and the beam cross section. In particular, the beam cross section elongated in the propagation direction makes it possible to generate a material modification which extends over the entire thickness of the glass. A material modification over the entire glass thickness may be generated, for example, directly by means of a single pulse or a single burst of laser pulses. As a result of the local heat effect of the laser, the material modifications are introduced into the ultrathin glass.

A material modification is a physical change in the glass material, said change being permanent in terms of the thermal equilibrium and causally originating from the direct laser radiation.

Here, the material modification may be a modification in the structure, in particular the crystalline structure and/or the amorphous structure and/or the mechanical structure, of the glass or of the transparent material. By way of example, an introduced material modification of an amorphous glass material may consist in the glass material obtaining a changed network structure by way of local heating only in that region. It is for example possible for amorphous regions or voids to be produced. It is for example possible for the bond angles and lengths of the network structure to be changed by the modification.

A material modification may in particular be a local change in density, which may also depend on the selected material, in particular on the type of glass.

In particular, the special shape of the laser beam and of the beam cross section, which gives rise to the material modification in the ultrathin glass, or the corresponding geometrical properties of the beam, are at least partially transferred to the shape of the material modifications generated in the glass.

In contrast to the material modification, the material modification region in this case comprises the entire region in which the effects of the laser pulse exposure can be measured on the basis of the tensile stresses and compressive stresses. This is in particular the region in which the material transitions, viewed spatially, starting from the material modification back into the initial state of the untreated regions of the glass material.

The ultrathin glass may also be partially heated in the material modification region by the heat transport in dependence on the thermal diffusion time and on the laser beam absorption capability of the ultrathin glass, and also on the pulse rate and the feed. Due to the temperature gradients which are produced by the local heat effect, stresses, which promote the formation of cracks, may occur in the material modification region during cooling and formation of the material modification. In particular, tensile stresses and compressive stresses may arise in the material modification region, which for example run radially or orthoradially. The stresses and the formation of cracks can be controlled by the shape of the material modification, such that a targeted crack progression in the ultrathin glass is possible through the selection of the shape, or of the cross section, of the material modification.

Typically, crack formation takes place along a preferred direction of the non-radially symmetric beam cross section—for example crack propagation takes place mainly in a direction of a longer extent of the beam cross section, which is accompanied by smaller radii of the contour of the beam cross section at the outer contour edges in this preferred direction.

The material modifications are introduced into the ultrathin glass along a desired separating line. Here, a separating line describes the line along which the ultrathin glass or parts of the ultrathin glass are intended to be separated or detached.

As a result of the material modifications introduced into the ultrathin glass along a separating line, the ultrathin glass is virtually perforated, such that the separating line defines a kind of predetermined breaking point in the ultrathin glass. The material modifications ensure, for example, that the material is weakened along the separating line, such that the ultrathin glass breaks along the separating line when a force is applied.

This can be attributed, inter alia, to the targeted crack formation, which proceeds from the material modification or the material modifications. The material modifications are introduced into the ultrathin glass in such a way that the crack formation proceeding therefrom produces a crack which preferably reaches as far as the adjacent material modification. It is in particular also possible for the cracks proceeding from two adjacent material modifications to meet between the material modifications and thus form a common crack. This makes it possible for the positions at which the material modifications are introduced into the ultrathin glass to be further away from one another.

In particular, targeted crack progression can be promoted by a rotation of the non-radially symmetric beam cross section and/or of the ultrathin glass, such that a preferred direction of the non-radially symmetric beam cross section is always oriented along the separating line as a result of the rotation. In this case, the beam cross sections may be rotated, for example, by the rotation of a beam-shaping unit.

If the feed direction between laser beam and ultrathin glass is, for example, perpendicular to an axis along which a preferred crack propagation takes place, it is unlikely that the cracks of adjacent material modifications will meet. By contrast, if the feed direction is parallel to the axis of the preferred crack propagation, it is likely that the cracks of adjacent material modifications will meet and merge. As a result of the rotation of the beam cross section and/or of the workpiece, it is possible to ensure a targeted crack progression over the entire length of the separating line even in the case of curved separating lines. This makes it possible to separate the ultrathin glass along separating lines of any desired shape.

The separating step may be effected by applying a thermal stress and/or applying a mechanical force, preferably a tensile force or bending force, and/or etching by means of at least one wet-chemical solution.

Preferably, in one embodiment, the ultrathin glass is separated along the separating line by application of a mechanical tensile force. The application of a tensile force may for example mean that an oppositely directed tensile force is applied to the area elements of the ultrathin glass which are separated from one another by the separating line. The respective area elements of the ultrathin glass can be separated from one another by the crack formation and the material modifications which are introduced along the separating line.

The separating step may also comprise repeatedly passing over the separating line while introducing laser pulses of the ultrashort pulse laser, wherein the laser parameters of the ultrashort pulse laser are preferably kept constant for all passes and particularly preferably correspond to the laser parameters used for the initial introduction of the material modifications.

Preferably, in another embodiment, the ultrathin glass is separated along the separating line by a multiple pass or a plurality of multiple passes with unchanged laser pulse parameters, that is to say identical pulse duration, identical repetition rate, identical pulse shape of the ultrashort pulse laser.

The multiple passes make it possible to induce microexplosions in the ultrathin glass along the separating line, which lead to an enhanced formation of cracks in the material of the ultrathin glass. Due to the non-radially symmetric beam cross section, this crack formation takes place along a preferred direction predefined by the long axis, such that, after a finite number of multiple passes, there is a separation of the ultrathin glass along the separating line.

Since no change in the laser parameters is provided for the multiple passes and in particular also no other laser is used for the separating step designed in this way, a particularly rapid and efficient separating method can be provided.

It is for example possible for well-structured area elements to be cut out of or separated from a glass wafer or a glass plate. However, it is also possible for a glass plate to be divided, for example, merely into two or more elements.

The method makes it possible to reduce the damaged regions in the glass, as a result of which the flexibility is not impaired by the separating process, which is particularly important for example in the case of foldable glasses.

In particular, this method has the advantage that the bending properties of the separated glass parts correspond largely to those of the unprocessed, original ultrathin glass. Thus, the material properties of the ultrathin glass also remain unchanged after the laser processing process. In other words, for example the bending properties of the glass are not affected by the separating process, such that the glass also has substantially the same bending properties at its separating edges as in the area of the ultrathin glass.

In the present context, the focal zone also describes that region of the intensity distribution in which the intensity of the laser light is high enough to introduce material modifications into the ultrathin glass.

Due to the use of a quasi non-diffractive beam, it is in particular also possible to make use of the fact that quasi non-diffractive beams have a considerably greater focal position tolerance owing to the longitudinally elongated focal zone. Consequently, the influence of local undulations in the glass and the focal adjustment is reduced. In this case, the greater focal position tolerance is due to the beam cross section which is elongated in the propagation direction.

In particular, elliptical quasi non-diffractive beams can be generated by way of quasi non-diffractive beams. Here, elliptical quasi non-diffractive beams exhibit special properties, which result from the analysis of the beam intensity. By way of example, elliptical quasi non-diffractive beams have a principal maximum, also referred to as global maximum, which coincides with the centre of the beam. The centre of the beam is in this case given by the location at which the long axis intersects the short axis. In particular, elliptical quasi non-diffractive beams may result from the superimposition of a plurality of intensity maxima, wherein, in this case, only the envelope of the intensity maxima involved is elliptical. In particular, the individual intensity maxima do not have to have an elliptical intensity profile.

In this case, the secondary maxima which are situated nearest to the principal maximum and which result from the solution of the Helmholtz equation have a relative intensity of more than 17%. Thus, depending on the transported laser energy in the principal maximum, so much laser energy is also conducted in the secondary maxima that material processing is made possible. In addition, the nearest secondary maxima always lie on a straight line which is perpendicular to the long half-axis a, or parallel to the short half-axis b, and which runs through the principal maximum.

In a further embodiment, an elliptical quasi non-diffractive beam may have a non-vanishing intensity along the long axis a, in particular may have an interference contrast $I_{max}-I_{min}/(I_{max}+I_{min})<0.9$, such that the beam transports laser energy all the way along the long axis a.

In this case, $I_{max}$ is the maximum beam intensity along the long axis a, while $I_{min}$ is the minimum beam intensity. If $I_{min}=0$, complete interference occurs along the long axis a and an interference contrast of 1 is produced. If $I_{min}>0$, only partial interference or no interference occurs along the long axis a, with the result that the interference contrast <1.

If, for example, the interference contrast along the long axis a is less than 0.9, only partial interference instead of complete interference occurs along the long axis a, which does not lead to complete eradication of the laser intensity at the location of the intensity minimum $I_{min}$. This is for example the case if the quasi non-diffractive beam is generated by means of a birefringent element, for example a quartz angle displacer or a quartz beam displacer or a combination thereof.

However, an elliptical quasi non-diffractive beam may also have a vanishing intensity and an interference contrast of 1 along the long axis a, such that the beam does not transport laser energy all the way along the long axis a. This is for example the case if the quasi non-diffractive beam is generated by means of a modified axicon.

Preferably, the focal zone elongated in the beam direction is longer than, preferably twice as long or ten times as long as, the thickness of the ultrathin glass. In this way, it is possible for the region of highest intensity to lie completely in the ultrathin glass and thus for a particularly efficient processing of the ultrathin glass to be achieved.

At the same time, by virtue of the fact that the focal zone extends over the entire thickness of the ultrathin glass, it is also possible to provide a high focal position tolerance, such that the method can be constructed in a particularly robust manner.

This may for example make it possible for permanent adjustment of the laser focus during a feed movement of the laser beam along the separating line to be omitted. As a result, for example the undulation of an ultrathin glass is only of secondary importance, if any, during the processing.

However, in particular the presence of the elongated focal zone also means that a material modification can be simultaneously introduced into the glass over the entire thickness of the glass. The material modification may have a non-radially symmetric material modification cross section.

In this case, the material modification cross section is the cross section of the material modification in a plane perpendicular to the laser beam. Due to the non-radially symmetric beam cross section perpendicular to the propagation direction, it is possible for particularly large material stresses to be introduced into the ultrathin glass in regions where the boundary line of the material modification cross section has small curve radii. Thus, the specific form of the material stress makes it possible to control the crack propagation in the glass particularly well.

This can be attributed to the fact that the ultrathin glass, in the region of the small curve radii, transitions particularly rapidly from the material modification to the original state. Consequently, particularly high stresses are to be expected in the region of the small curve radii. In particular, particular material stresses are to be expected in the case of any points or tapering regions of the material modification.

By way of example, in the case of an elliptical material modification, a crack propagation along the long axis a is to be expected. By way of example, in the case of a material modification of cross-like form, a crack propagation along the cross axes is to be expected. In particular, it is possible for adjacent material modifications to be matched to one another by the respective orientation in such a way that the respective cracks of the material modification at least partially join together to form an overall crack.

The long axis of the non-radially symmetric material modification cross section may be oriented along the separating line.

Oriented along the separating line means that the material modification lies on the separating line and the long axis of the material modification at least partially runs tangentially with respect to the desired separating line. This may for example mean that, in the case of an elliptical material modification cross section, the centre of the ellipse lies on the desired separating line and the long axis a lies in the centre of the ellipse tangentially with respect to the separating line. However, it may also mean that, in the case of a cross section of cross-like form, the cross centre point is positioned on the separating line and the cross is rotated about its centre point such that an axis of the cross is tangential to the separating line at the cross centre point.

What this achieves is that the crack propagation at least partially runs on the desired separating line.

The distance between the material modifications introduced into the ultrathin glass along the separating line may be greater than, for example twice as great or four times as great or ten times as great as, the long axis of the non-radially symmetric material modification cross section.

In this case, the distance may be defined as the minimum spacing between adjacent material modifications, in particular the peripheries of the material modifications. By way of example, two adjacent elliptical material modifications may have long axes of in each case 5 µm. With the single distance, the periphery of the second material modification begins at a spacing of 5 µm from the periphery of the first material modification. With the four-fold spacing, the periphery of the second material modification begins at a spacing of 20 µm from the periphery of the first material modification.

As an alternative, it is possible for the distance between material modifications to be given by the spacing of the centres of the material modifications. This may for example mean the geometrical centre of the material modification.

In this case, the centre of a material modification typically coincides with the centre of the laser beam. It is therefore also possible for distance to mean the spacing between the laser beams which have introduced the material modifications. However, it may for example also mean the spacing between the intensity centroids of the respective beam cross sections.

In particular, in this way the material modifications may be far away from one another, such that only a few material modifications are required in the ultrathin glass in order to describe a pronounced separating line. As a result, the ultrathin glass is subjected to as little processing as possible, which saves on process time, but also leaves the original material properties of the glass material largely unchanged.

The entirety of the material modifications introduced by a beam cross section may have a non-radially symmetric shape.

If a non-radially symmetric beam cross section is used, the laser beam generally comprises different intensity maxima distributed over the cross section. These may for example be the intensity maxima which result from the use of a Bessel-like beam.

The different maxima for example all exhibit the property that they can introduce different and independent material modifications into the ultrathin glass, whereas, in the regions between the intensity maxima, the intensity of the laser beam is so low that no material modifications could be formed. However, when using a non-radially symmetric beam cross section, the intensity maxima are often located so close to one another that although the material modifications by the individual intensity maxima do not overlap, the different material modification regions possibly do. If the material modification regions overlap, a contiguous material stress forms in the superimposed material modification regions. The individual intensity maxima of a laser beam may thus likewise result in a material stress distribution in the ultrathin glass that gives preference to a crack propagation in a certain direction. The entirety of the material modifications which are introduced by the intensity maxima thus also ensure a controllable crack propagation, even if the individual material modifications by the individual intensity maxima have a different preferred direction of crack propagation.

The direction of crack propagation can be rotated by increasing or lowering the laser energy of the laser.

By way of example, an elliptical, non-diffractive beam may have a nearest secondary maximum with a relative intensity of at least 17%, for example 30%. In a first process step, the laser pulse/laser pulse train has so much laser pulse energy/laser pulse train energy that the processing threshold lies at a relative intensity of 50%. The processing of the glass is then possible only with the elliptical principal maximum of the beam, the long axis a being oriented for example along the x-axis. In particular, in this first process step, the laser energy transported in the next secondary maximum is too low to bring about material processing.

In a further process step, the laser energy may be increased, with the result that the secondary maxima of the laser beam also transport a sufficient amount of laser energy to bring about material processing. In particular, it may suffice to increase the laser energy such that material processing can be brought about already with a relative intensity of 25%. In this case, the nearest secondary maxima are oriented parallel to the short axis b of the beam cross section, for example the y-axis. Since the amount of laser energy in the secondary maxima is high enough to bring about material processing, this may have the effect that the material modification regions overlap and thus a contiguous elliptical material modification is introduced into the glass, the long axis extending along the y-axis.

Through the selection of the laser energy, it is thus possible to determine the orientation of the material modification introduced and thus also the direction of crack propagation. In particular, it is possible in this case to omit the use of a 5-axis feed device for introduction of two-dimensional cutting patterns (see below).

The material modifications may be generated by means of a laser pulse, preferably having a wavelength of between 300 nm and 2000 nm, particularly preferably having a wavelength of 1550 nm, or 1064 nm, or 1030 nm, or 515 nm, or 343 nm. The pulse duration may be shorter than 1 ns, in particular shorter than 100 ps, preferably shorter than 3 ps, for example may be 300 fs or 100 fs or a few 10 s of fs. The pulse energy may be less than 100 µJ, preferably less than 50 µJ, in particular may be between 10 µJ and 20 µJ. The repetition rate of the ultrashort pulse laser may be less than 1 MHz, preferably less than 100 kHz, particularly preferably less than 50 kHz. In particular, the laser pulses may be emitted in a pulse train, what is known as a burst. In this case, a burst may comprise between one and more than 10, for example 20, laser pulses, preferably between two and six laser pulses, the repetition rate within a pulse train being between 100 MHz and 50 GHz.

This has the advantage that the method can be used within a wide parameter range. Furthermore, this affords the advantage that the material modifications are introduced into the ultrathin glass in a low-damage manner, such that the separating edges of the separated ultrathin glass substantially or completely have the flexibility of the original glass.

The ultrathin glass may be thinner than 1000 preferably thinner than 200 particularly preferably may be between 10 µm and 150 µm thin, in particular 30 µm or 50 µm or 10 µm thin.

In this way, inter alia, particular bending properties are achieved.

Advantageously, each material modification is introduced into the ultrathin glass by a single ultrashort laser pulse or by a single burst of ultrashort laser pulses.

What can advantageously be achieved thereby is that all of the material modifications are introduced into the ultrathin glass in a single pass of the laser beam, provided by the ultrashort laser pulses, along the separating line and the ultrathin glass is then separated by application of the tensile force.

In other words, this makes it possible to achieve a particularly efficient and rapid separating process which results in a high quality of the separating edges.

The ultrashort laser pulse may be split by a beam splitter optical unit and thus a plurality of material modifications are simultaneously introduced into the ultrathin glass.

In this case, a beam splitter optical unit may include optics elements which split the laser beam and optics elements which direct and/or focus all resulting partial beams onto the ultrathin glass in order to introduce a material modification.

By way of example, using a 50/50 beam splitter, the first half of the laser pulse energy of the laser pulse can be directed directly onto the ultrathin glass. The second half of the laser pulse energy can be directed onto the ultrathin glass via a mirror. It is thus possible for one laser pulse to generate a plurality of material modifications.

This has the advantage that the feed rate of the laser can be increased and thus the process speed overall can also be increased.

The object stated above is also achieved by means of a device for separating ultrathin glass having the features of claim 12. Advantageous developments of the device emerge from the dependent claims, from the present description and from the figures.

Correspondingly, a device for separating ultrathin glass is proposed, comprising an ultrashort pulse laser, a beam-shaping optical unit, a focusing unit and a feed device, and also a control device, wherein these are configured such that the ultrashort pulse laser emits Gaussian laser beams comprising ultrashort laser pulses to the beam-shaping optical unit, the beam-shaping optical unit generates quasi non-diffractive laser beams with non-radially symmetric beam cross section from the Gaussian laser beams, wherein the extent of the focal zone along the propagation direction of the beam profile is greater than, preferably twice as great or ten times as great as, the thickness of the ultrathin glass, the focusing unit focuses the laser beam or the multiplicity of partial beams into the ultrathin glass, a feed device can move the laser beam and the ultrathin glass relative to one another in translation and/or rotationally, and the control device via control signals can increase the laser energy, and/or can move the feed device and/or can rotate the beam-shaping optical unit such that the long axis of the non-radially symmetric material modification cross section is oriented along the separating line.

The beam-shaping optical unit may be, for example, a diffractive optical element or an axicon, by means of which a Bessel-like laser pulse can be generated from the Gaussian laser pulse.

The focusing unit focuses the laser beam or the multiplicity of partial beams into the ultrathin glass. In this case, the feed device moves the laser beam or the multiplicity of partial beams and the ultrathin glass relative to one another in translation and/or rotationally.

The focusing unit may comprise, for example, a lens system or a plurality of lens systems.

The feed device may be, for example, an XY table or an XYZ table. Using the latter, it is particularly advantageously possible for the focus for all of the partial beams to be simultaneously displaced in the ultrathin glass. A translational movement describes a displacement in space, while a rotational movement permits a rotation of the ultrathin glass about a certain spatial axis. The spatial axis particularly preferably coincides with one of the partial beams. In principle, however, rotations through, for example, all Euler angles are also possible. The feed device may alternatively or additionally be a beam-shaping unit, which, by the variation of the installed optical elements, directs the beam to different locations and/or in different shapes to the ultrathin glass.

The control device may be connected to the feed device, wherein the control device transforms the user commands of a user of the device into control commands for the feed device and thus, for example, starts a predefined trajectory. The control device may also be connected to a rotator of the beam-shaping optical unit, wherein the beam-shaping optical unit or else merely individual components of the optical unit can be rotated about the beam propagation direction of the laser beam, with the result that the mapping of the beam shape on the ultrathin glass appears in rotated form. The control device may in particular be connected to the laser and may set the laser pulse energy of the laser pulses, such that, for example, the laser intensity of an elliptical quasi non-diffractive beam is set and thus ultimately the direction of crack propagation is predefined.

In this way, the long axis of a non-radially symmetric beam cross section can be guided along the separating line in order to bring about the formation of cracks along the separating line.

The device for separating ultrathin glass may also comprise a beam splitter optical unit, wherein the quasi non-diffractive laser beams are relayed from the beam-shaping optical unit to the beam splitter optical unit.

The beam splitter optical unit splits the laser beam into a multiplicity of partial beams and deflects the partial beams to the focusing unit. As an alternative, the beam splitter optical unit only deflects the laser beam without splitting it.

By splitting the laser beam into partial beams, it is possible for material modifications of identical shape to be generated in the ultrathin glass. This makes it possible for the feed of the feed device of the laser light relative to the ultrathin glass to be increased, for example to be doubled, because now a plurality of modifications per laser pulse are introduced into the ultrathin glass.

The ultrashort laser pulses of the ultrashort pulse laser may have a wavelength of between 100 nm and 2000 nm, preferably a wavelength of 1550 nm or 1064 nm or 1030 nm or 515 nm or 343 nm. The pulse duration may be shorter than 1 ns, in particular shorter than 100 ps, preferably shorter than 3 ps, for example may be 300 fs or 100 fs or a few 10 s of fs. The pulse energy may be less than 100 preferably less than 50 µJ, in particular may be between 10 µJ and 20 µJ. The repetition rate of the ultrashort pulse laser may be less than 1 MHz, preferably less than 100 kHz, particularly preferably less than 50 kHz. In particular, the laser pulses may be emitted in focused form in a pulse train, what is known as a burst. In this case, a burst may comprise between one and more than 10, for example 20, laser pulses, preferably between two and six laser pulses, the repetition rate within a pulse train being between 100 MHz and 50 GHz.

Preferred exemplary embodiments are described below with reference to the figures. In this case, elements that are the same, similar or have the same effect are provided with identical reference designations in the different figures, and a repeated description of these elements is omitted in some instances, in order to avoid redundancies.

FIG. 1 schematically illustrates the separating method for separating ultrathin glass 1. In order to separate the ultrathin glass 1, a laser beam 60 of an ultrashort pulse laser 6 is transmitted through a beam-shaping optical unit 9, wherein the laser beam 60 is impressed with a specific beam shape, and focused into the ultrathin glass 1. Running in the laser beam 60 are the laser pulses which are absorbed by the ultrathin glass 1, in order to thereby introduce a material modification 3 into the ultrathin glass 1. The hatched plane in this case shows the plane below the separating line along which the ultrathin glass 1 is separated.

The ultrathin glass 1 has a thickness D, which may be, for example, 100 µm or 50 µm or 30 µm or 10 µm.

Here, the elongated focal zone of the laser beam 60, which results from the focused laser beam 60, is significantly greater in the propagation direction than the thickness D of the ultrathin glass 1, such that the laser beam 60 is used to simultaneously generate a material modification 3 over the entire thickness D of the ultrathin glass 1.

In particular, it is thus possible to generate a material modification 3 over the entire thickness D of the ultrathin glass 1 by means of a single laser pulse or a single laser burst. It is possible for the ultrathin glass 1 to be separated along the separating line after only one pass of the laser beam 60.

Due to the absorption of the laser pulses in the ultrathin glass 1, the ultrathin glass 1 is heated locally. In this case, the local heating may lead to a modification of the glass network structure, in particular a change in the network structure, for example a change in the bond angles and lengths or what are known as voids may be generated locally in the case of an amorphous glass material. However, it is also possible for the local heating to modify other physical properties of the ultrathin glass.

This modification produces the material modification 3. A material modification region 30 is formed around the material modification 3. In the material modification region 30, the material gradually transitions from the state present in the material modification 3 back to its original state the further away from the material modification 3 the material is viewed. The original state may be, for example, the unprocessed state of the glass material, which is, for example, present at adjacent points in the glass. Here, however, the original state is also understood to mean that state of the glass material which was present prior to the introduction of the material modification 3.

Local stresses, which promote the formation of cracks, may occur in the material modification 3 and in the material modification region 30. By way of example, the ultrathin glass 1 may have a different density—for example a lower density—due to local heating and, as a result, a compressive stress may build up in the material modification region 30. However, in the heated region, it is also possible for there to be a higher density and thus for a tensile force to be built up in the material modification region 30. If the tensile stress and/or compressive stress becomes too great, for example greater than the tensile strength or compressive strength of the untreated ultrathin glass, the spontaneous formation of a crack may occur. The propagation direction of such cracks, which are produced at the periphery of the material modification 3 and/or in the material modification region 30, may, through selection of the beam cross section perpendicular to the propagation direction, be directed in a targeted manner from one material modification 3 to another material modification 3. Owing to the targeted crack formation between the material modifications 3, the latter do not have to be impressed in such a pronounced manner, with the result that low pulse energies, for example of less than 100 µJ, may be sufficient for separation of the ultrathin glass 1. The targeted crack progression also has the effect that the cracks do not propagate in a random manner and thus weakening of the separated material is counteracted, and correspondingly the bending capability of the separated material is only insignificantly impaired, if at all.

As shown in FIG. 1, a plurality of material modifications 3 are introduced into the ultrathin glass 1. Material modification regions 30 form around each material modification 3. In this case, the material modifications 3 are placed along the desired separating line 2. The separating line 2 is an imaginary line along which the ultrathin glass 1 is intended to be separated. It is thus possible to control the crack propagation in the glass 1 in such a way that the ultrathin glass 1 is weakened in a targeted manner along the separating line 2 and thus a predetermined breaking point is introduced in the ultrathin glass 1.

After the material modifications 3 have been introduced into the ultrathin glass 1 by means of the laser beam 6, the ultrathin glass 1 can be separated by application of a tensile force FZ to the glass halves 10 and 12 which are separated by the separating line 2. The separating edge 20 is then produced along the separating line 2. In this case, the flexibility of these laser-modified separating edges 20 is comparable to the flexibility of the unprocessed material, and therefore the separating process has no or barely any negative effect on the original glass properties. As an alternative to the tensile force, it is also possible, as mentioned above, to use another kind of separating process in the separating step.

In other words, what can be achieved by means of the described method is that, after the separation, the properties of the ultrathin glass 1 are largely or completely retained even at the edges.

FIG. 2A shows a plan view of the separating process in the xy-plane—that is to say the plane lying in the ultrathin glass 1. The material modifications 3 are introduced into the ultrathin glass 1 along the desired separating line 2.

A material modification region 30, in which the formation of cracks or at least a material stress occurs, is formed around the material modification 3. In the figure, the material modifications 3 are shown in elliptical form such that they have a long axis 42. Owing to the elliptical shape of the beam cross section perpendicular to the propagation direction, the cracks 32 or the material stresses preferably propagate in the direction of the long axis 42 of the elliptical beam cross section. Since the material modifications 3 are placed next to one another along the separating line 2, the crack propagates, as seen globally, from material modification 3 to material modification 3, such that the crack largely follows the separating line 2.

It is for example possible to use ultrashort laser pulses to introduce the material modifications 3, wherein each laser pulse may have a pulse energy of 15 µJ. In this case, it is also possible for the laser pulses to be introduced in bursts into the ultrathin glass 1. It is for example possible for one material modification 3 per burst to be generated. By way of example, a burst may comprise four laser pulses, such that, with a pulse energy of 15 µJ, each burst then has a laser pulse train energy of 60 µJ. In this case, the distance between the adjacent material modifications 3 may be 10 µm. A material modification is preferably introduced by means of a single burst.

A burst may also comprise six laser pulses each having a pulse energy of 10 µJ, and therefore each burst has a laser pulse train energy of 60 µJ. By way of example, the distance between the material modifications 3 may then be 15 µm.

Due to the targeted control of the crack formation and crack progression in the ultrathin glass 1, it is therefore possible for the distance between the material modifications 3 to be kept relatively large. The feed of the laser beam 60 over the material may be, for example, 50 mm/s; however, the feed may also be significantly greater, for example 5 m/s or 1 m/s.

Figure 2B:
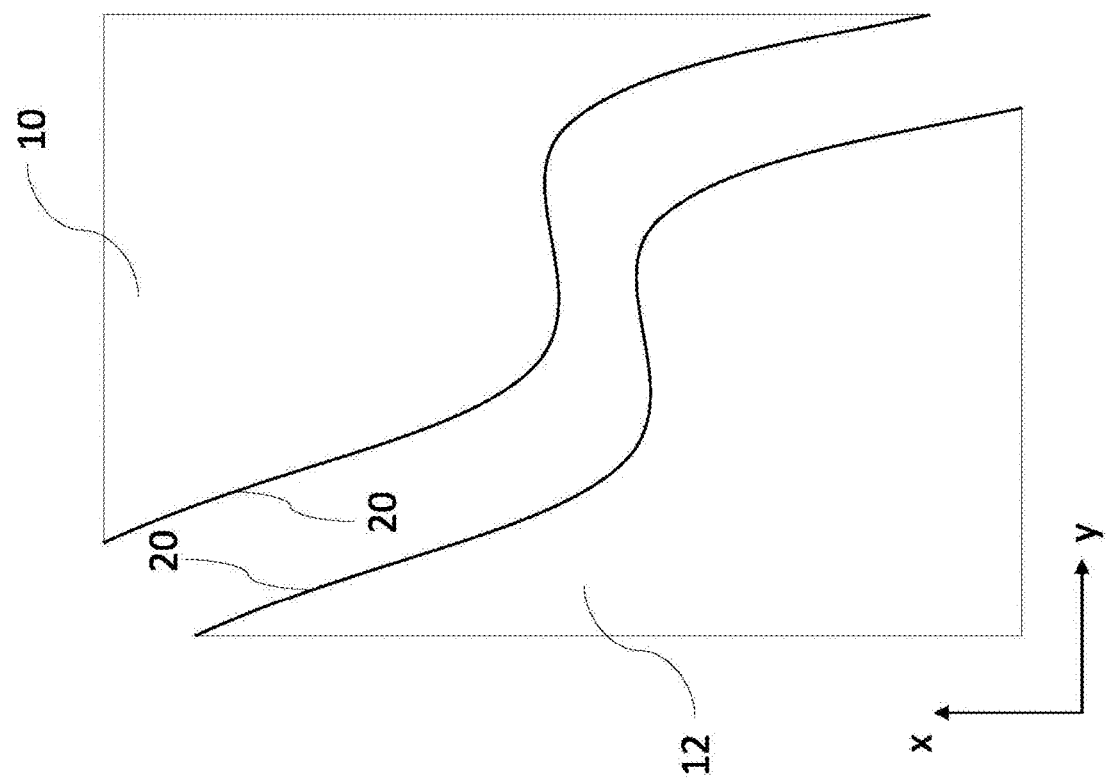

FIG. 2B shows that the glass 1 can be divided into a first glass half 10 and a second glass half 12 by application of a tensile force FZ. A separating edge 20 is then produced along the original separating line 2. In this case, the separating edge 20 has a very high quality—in particular the properties of the glass material at the separating edge 20 barely differ or do not differ from those in the rest of the glass material of the ultrathin glass 1.

By way of example, the separating edge 20 exhibits a roughness of between 0 µm and 0.4 µm. As a result of the low roughness of the separating edge 20 and the low damage to the material due to the laser processing, the separated ultrathin glass 1 is also still very flexible. By way of example, the separated ultrathin glass 1 can be bent up to 2.5°/mm.

FIG. 3A shows an elliptical material modification 3 in an ultrathin glass 1. The material modification 3 is introduced into the ultrathin glass 1 by the laser beam 60 of the laser 6. Here, the shape of the material modification 3 is predefined by the beam cross section 4 of the laser beam 60. Around the region of the material modification 3, in which the ultrathin glass 1 is exposed directly to the laser beam 60 for the duration of the laser pulse, a material modification region 30 is formed. This material modification region 30 is formed, for example, by the transport of heat from the material modification 3 to the surrounding glass regions.

Correspondingly, material stresses, which promote the formation of cracks, may occur both in the material modification 3 itself and in the material modification region 30. By way of example, in the case of an elliptical material modification, crack formation may be promoted at those points of the ellipse where the curve radius of the boundary line is particularly small. A small curve radius ensures that the stress which is introduced into the glass 1 by the material modification 3 can be dissipated in many different directions in a particularly rapid manner. Thus, relaxation of the material stress is effected with higher probability at this point than at locations where the material stress is able to relax only in a few directions. As a result, in the glass 1, those points of the material modification 3 which have a small curve radius are particularly unstable.

The formation of the crack 32 then preferably takes place in the direction of the long axis of the elliptical material modification 3. It is thus possible for the crack propagation to be controlled by the orientation of the material modification 3. It is in particular possible for the crack propagation from one material modification 3 to another material modification 3 to be controlled.

In FIG. 3B, a plurality of material modifications 3 have been introduced into the ultrathin glass 1. The material modifications 3 are once again elliptical. As a result, the cracks particularly preferably form along the long axis of the ellipse, at the points of the smallest curve radii of the ellipse. In the figure, the material modifications 3 have been placed so close to one another that the respective cracks of adjacent material modifications overlap. This makes it possible for the cracks to join together and form a common crack between two adjacent material modifications. By way of example, this method may be used to introduce cracks into the ultrathin glass 1 along any desired separating lines 2.

Figure 4B:
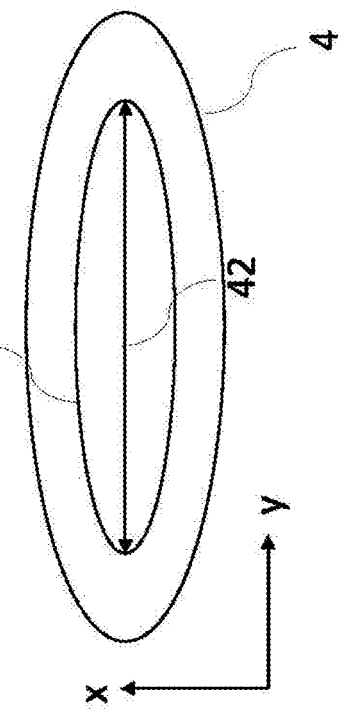
FIGS. 4A, 4B, and 4C show different beam cross sections and focal zone of the beam according to some embodiments.
Figure 4C:
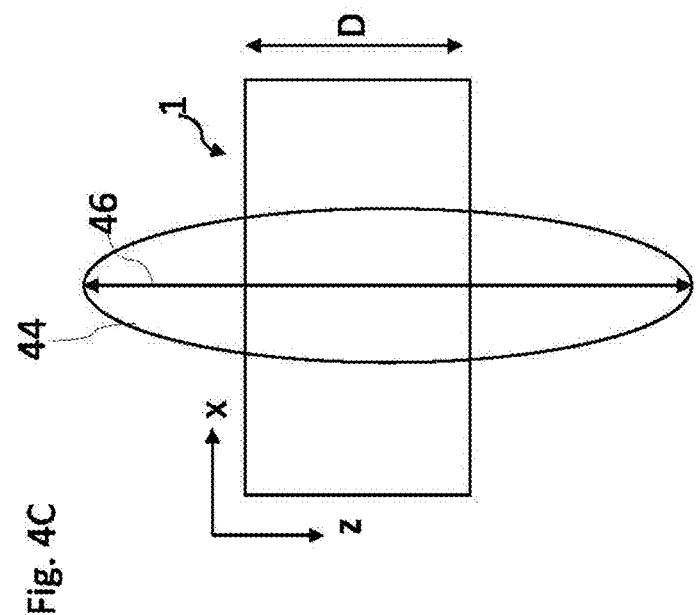
Figure 4A:
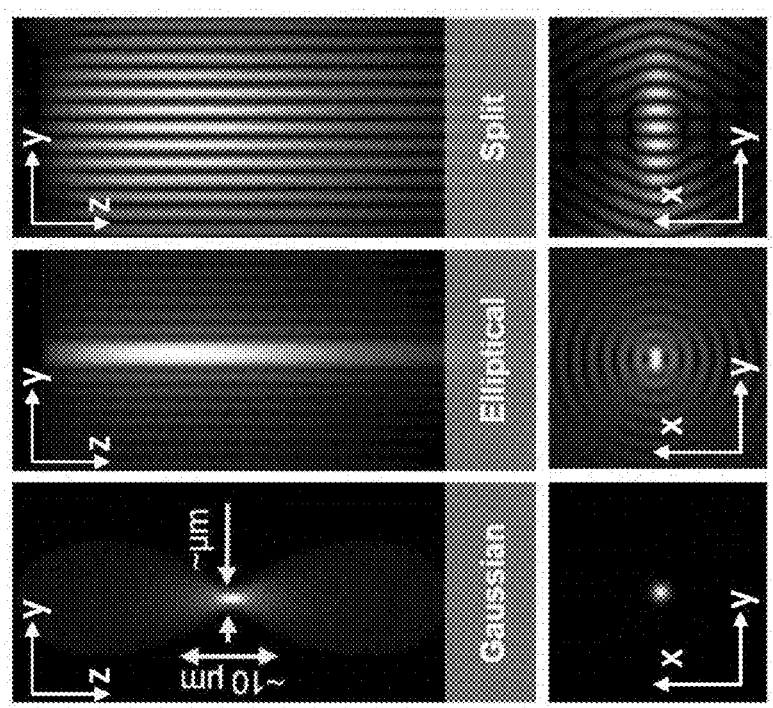

FIG. 4A shows different examples of beam cross sections along the propagation direction (xy-plane) together with the beam cross sections perpendicular to the propagation direction (xy-plane). It can clearly be seen that a radially symmetric Gaussian beam cross section has a significantly smaller extent in the propagation direction than the beam cross sections of the quasi non-diffractive beams, such as an elliptical quasi non-diffractive beam.

FIG. 4B shows the elliptical focal zone of an elliptical beam cross section 4 perpendicular to the propagation direction of the laser beam 60. The focal zone 44 shown thus corresponds to that proportion of the beam cross section 4 of which the intensity is high enough to introduce a material modification 3 into the glass. The focal zone 44 has a long axis 42. Furthermore, the focal zone 44 is delimited by the boundary line 40. The boundary line 40 has different curvatures depending on which point on the boundary line 40 in the xy-planes is considered. The curve radius of the boundary line 40 is particularly small at the point at which the long axis 42 of the ellipse intersects the boundary line 40. The boundary line 40 is intersected by the long axis 42 at two opposite points. The curve radius of the boundary line 40 is particularly great at the point at which the small half-axis of the ellipse intersects the periphery of the focal zone. This particular geometry may give rise, by introduction of the beam cross section 4 into a glass 1, to a material modification 3 of the same shape.

FIG. 4C shows the focal zone 44 of the beam 6 along the propagation direction. The focal zone 44 is in particular elongated in the propagation direction (z-axis) and is in particular significantly greater than the glass thickness D. There is thus a certain focal position tolerance, such that it is possible to pass over any undulations of the glass 1 without needing to readjust the focus of the laser beam 60. In particular, it is thereby also possible to introduce a material modification 3 that extends over the entire glass thickness D of the ultrathin glass into the ultrathin glass.

Figure 5A:
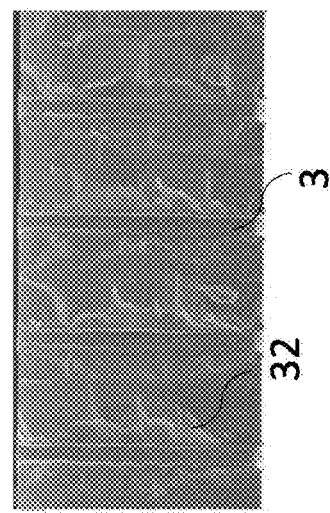
FIGS. 5A, 5B, 5C, 5D, 5E, and 5F show measured beam cross sections and cracks generated thereby in the ultrathin glass according to some embodiments.

A further beam cross section of a quasi non-diffractive beam can be seen in FIG. 5A. In this case, the beam cross section of the quasi non-diffractive beam has different intensity maxima, or what are known as secondary maxima, both in the x-direction and in the y-direction. In particular, the shown beam cross section of the quasi non-diffractive beam is of cross-like form. The beam cross section of the quasi non-diffractive beam has, from the centre, four intensity maxima in the positive y-direction and five intensity maxima in the positive x-direction.

Figure 5E:
Figure 5B:
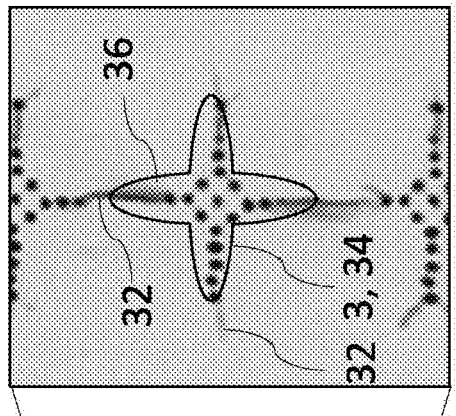

FIG. 5B shows the boundary line 40 of the cross-like beam cross section of the quasi non-diffractive beam. In this case, the boundary line 40 comprises the intensity maxima that allow the material or the glass 1 to be modified. Owing to the cross-like beam cross section, the cross has a plurality of long axes 42. In this case, the long axes are oriented parallel to the cross axes. The points at which the long axes intersect the boundary line 40 are the points at which the boundary line has a particularly small curve radius. It is thus possible to predict the expected crack propagation. The crack propagation takes place in the direction of the long axes 42 of the beam cross section or of the corresponding material modification 3.

Figure 5F:
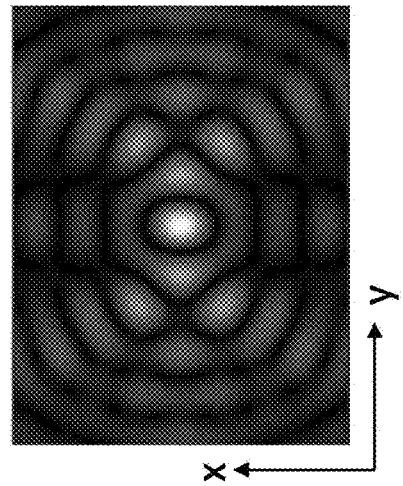
Figure 5C:
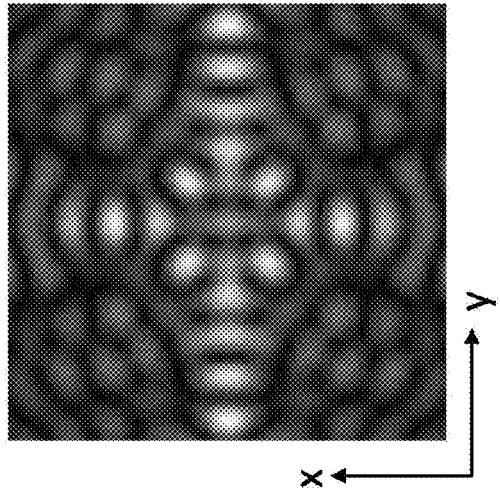
Figure 5D:
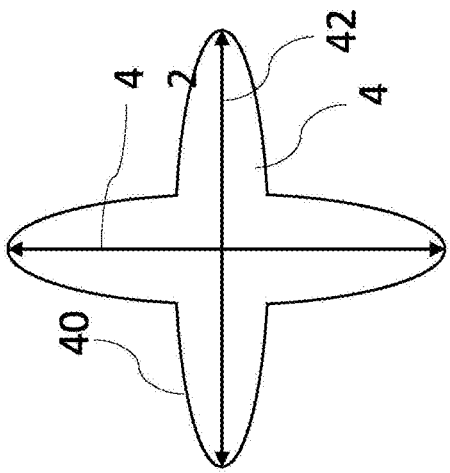

FIG. 5C shows the material modifications 3 which are introduced into the glass 1 by means of the cross-like beam cross section of the laser. FIG. 5D shows an enlarged detail from FIG. 5C. It can be seen that the intensity maxima of the beam cross section give rise to a particularly pronounced material modification 3. The material modification region 30 of each material modification 3 of each intensity maximum may overlap with the material modification region 30 of the adjacent intensity maximum depending on the selected pulse energy. This makes it possible for a contiguous material stress to be built up in the overlapping material modification region 30. Thus, it is in particular possible for the material modification composed by the different intensity maxima to be regarded as a single material modification 3. The material stress may then relax at the locations of the material modification 3 at which the boundary line has a particularly small curve radius.

It can readily be seen in FIG. 5D that the cracks 32 each propagate along the long axes in the material modification 3. It is in particular shown that the cracks 32 of adjacent cross-like material modifications 3 join together to form a single crack 32. It is thus possible for the crack propagation through the ultrathin glass 1 to be controlled by the orientation of the cross-like material modification 3. In particular, it is possible, due to the targeted crack propagation, for the material modifications 3 to be introduced into the ultrathin glass 1 at a relatively large spacing from one another. The ultrathin glass 1 is thus not subjected to any unnecessary damage or processing.

An electron micrograph of a separated ultrathin glass can be seen in FIG. 5E. It is clearly possible to see the introduced material modifications 3 extending over the entire glass thickness D. What are also shown proceeding therefrom are the cracks 32 which are brought about by the material modifications 3 and which extend substantially from one material modification 3 to an adjacent material modification 3.

A further non-radially symmetric beam cross section can be seen in FIG. 5F. An intensity maximum which is adjoined to the left and to the right by two further local intensity maxima is shown in the centre. Further intensity maxima adjoin above and below the adjacent intensity maxima, with the result that an "H"-shaped beam cross section is produced overall.

FIG. 6 shows a detailed analysis of an elliptical non-diffractive beam cross section. FIG. 6A shows the transverse intensity distribution of the laser beam 60, the principal maximum and the secondary maxima resulting from the solution of the Helmholtz equation.

FIG. 6B shows what are known as the isointensity lines of the intensity distribution from FIG. 6A, the lines being depicted at the location where the relative intensity of the laser beam is 25%, or 50%, or 75%. It is clearly visible that the principal maximum 41 of the intensity distribution has an approximately elliptical shape, which is elongated along the x-axis and wherein the extent along the x-axis is significantly greater than the extent along the y-axis. In particular, the principal maximum is adjoined by two kidney-like secondary maxima 43, which have a significantly lower relative intensity.

FIG. 6C shows a cross section through the intensity distribution from FIG. 6A, through the centre of the principal maximum along the x-axis. The intensity distribution exhibits its maximum in the centre of the principal maximum, wherein here, by definition, the relative intensity is 100%. Along the positive and negative x-direction, the intensity distribution decreases until a minimum in the relative intensity distribution is reached at about 0.003 mm, said minimum being different from 0%, however. Consequently, laser energy is also transported between the principal maximum 41 and the secondary maxima 43 of the laser beam 60.

FIG. 6D shows a cross section through the intensity distribution from FIG. 6A, through the centre of the principal maximum 41 along the y-axis. Once again, the intensity maximum can be found in the centre here, but the intensity decrease along the y-direction is significantly more rapid, such that the intensity minimum is reached at about 0.002 mm. In this case, the intensity minimum is exactly zero, since complete interference is present here for the laser beam 60. In particular, secondary maxima can again be found at greater values on the y-axis, which for example lie above a relative intensity value of 25%. This is not the case in the cross section of the x-axis from FIG. 6C. The properties of the elliptical beam cross section therefore differ along the different propagation directions.

In particular, it is shown in FIGS. 6C and 6B that the long half-axis a is measured from the centre of the principal maximum to the decrease of the relative intensity to 50%. In an analogous manner, the length of the short half-axis b is measured from the centre of the principal maximum to the decrease of the relative intensity to 50%. In this case, the long and short half-axes are perpendicular to one another.

It can furthermore be seen that the secondary maxima which have a relative intensity of more than 25% are located above and below the principal maximum along the y-axis. This has far-reaching consequences for the material processing, as shown in FIGS. 7A,B. By way of example, FIG. 7A shows a first process step of the method in which the laser energy is set such that material processing is possible only from a relative intensity of 50%. To a certain extent, the focal zone of the intensity profile is given by the isointensity line at 50%. Below a relative intensity of 50%, not enough laser energy is introduced into the material to process the material. In particular, the material modification 3, or the boundary line 40, then has the shape of the central principal maximum, which in this case is elliptical. The long axis of the boundary line 40 lies parallel to the x-axis, with the result that a preferred crack formation can be expected along the x-axis.

Figure 7B:
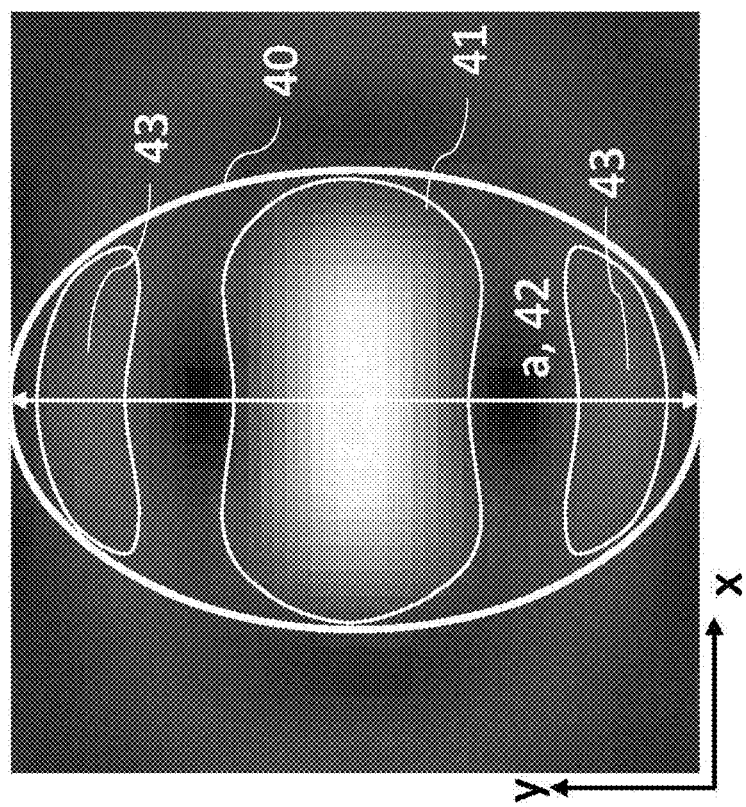
FIGS. 7A and 7B show beam cross sections with different laser energies according to some embodiments.
Figure 7A:
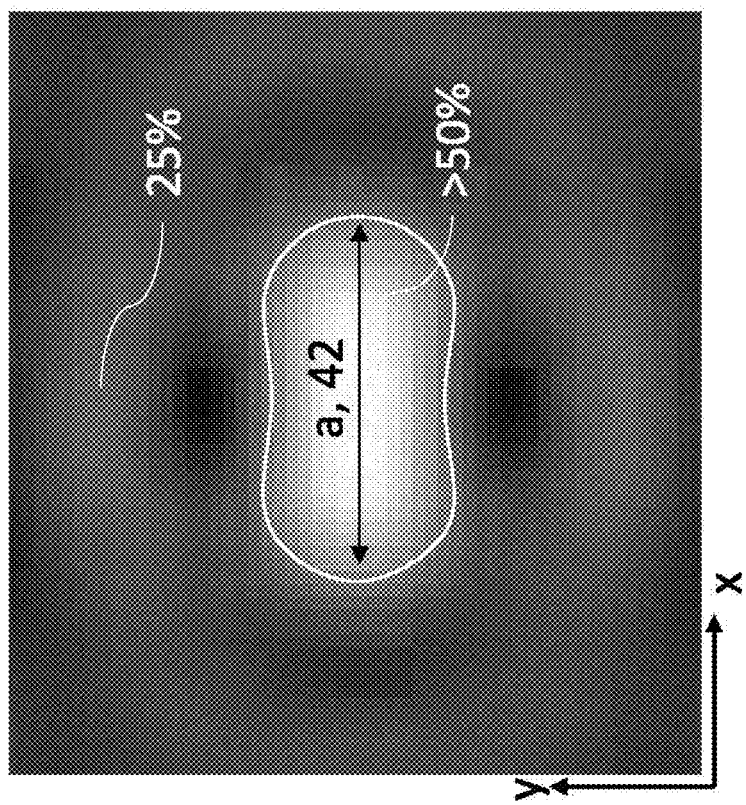

A further process step is shown in FIG. 7B. The laser pulse energy or laser pulse train energy has been increased, such that material processing is possible already from a relative intensity of 25%. The focal zone within which material processing takes place is thus given by the 25% isointensity line. This means, in particular, that the laser energy has doubled. In the case of this specific beam cross section, above 25% a sufficient amount of laser energy is transported in the secondary maxima to perform material processing using the secondary maxima and to introduce material modifications 3 into the material.

In particular, the secondary maxima extend along a direction perpendicular to the long axis of the principal maximum.

The principal maximum and the two secondary maxima in each case form, for example, overlapping material modification regions, with the result that an elliptical material modification 3 is produced overall, the long axis of which extends in the y-direction. Crack formation can thus also be expected along the y-direction.

In particular, the direction of crack propagation has thus been determined by the variation of the laser energy. Correspondingly, it is for example possible for rectangles to be cut out of a glass by this method, it being possible to omit the use of expensive positioning technology, in particular a 5-axis positioning device. Although the quality of the cut edges is reduced slightly by this method, the good separability remains.

FIGS. 8A,B,C show an elliptical intensity profile with reduced interference contrast along the long main axis. In the case of the reduced interference contrast, the modulations by the secondary maxima are significantly reduced. As a result, it is possible to process the glass 1 with significantly greater laser power, without a change in direction of the crack propagation being effected, compared with FIGS. 7A,B. By way of example, the intensity distribution along the x-axis, shown in FIG. 8B, and the intensity distribution along the y-axis, shown in FIG. 8C, lie significantly below the aforementioned threshold value of 25%, such that a variation of the laser energy merely brings about a variation of the strength of the material processing in the principal maximum.

Figure 9B:
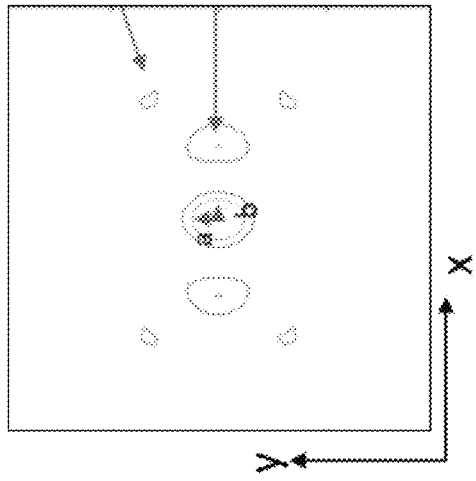
FIGS. 9A, 9B, 9C, and 9D show a further analysis of further beam cross sections according to some embodiments.
Figure 9D:
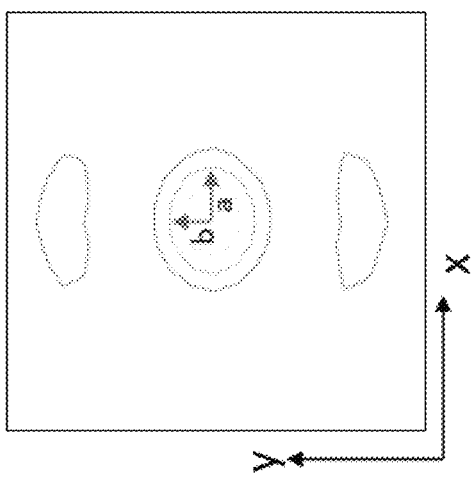
Figure 9A:
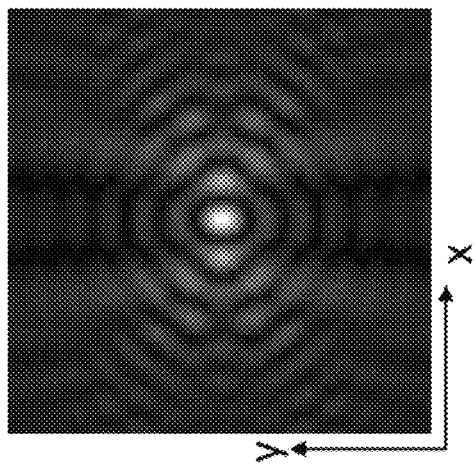

FIG. 9A shows a further intensity profile of the xy-plane, the associated isointensity lines for a relative intensity of 25% being shown in FIG. 9B. The isointensity lines show that, in addition to the secondary maxima which lie on a straight line parallel to the short half-axes of the ellipse, there are also further secondary maxima which lie above the 25% threshold. However, only the nearest secondary maxima are relevant to the method, since these predefine the direction of crack propagation. The further secondary maxima influence the crack propagation only to a slight extent, since they are by way of example, as in the present case, introduced into the material in a mirror-symmetric manner with respect to the x-axis and thus cannot bring about a preferred direction of crack propagation in the y-axis.

Figure 9C:
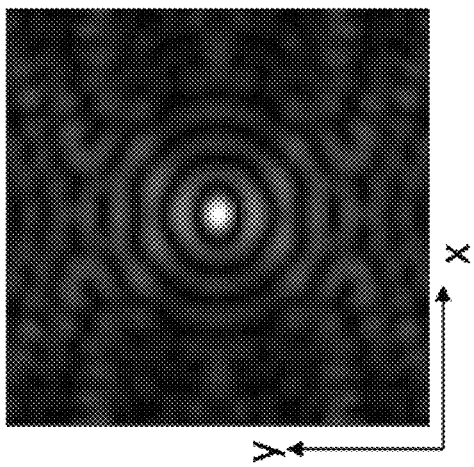

Furthermore, the interference contrasts in the intensity distributions shown in FIGS. 9A and 9C are around 1, with the result that completely destructive interference is present between the secondary maxima. This has the result that smaller modifications are produced and thus the length of the cracks becomes smaller.

Figure 10:
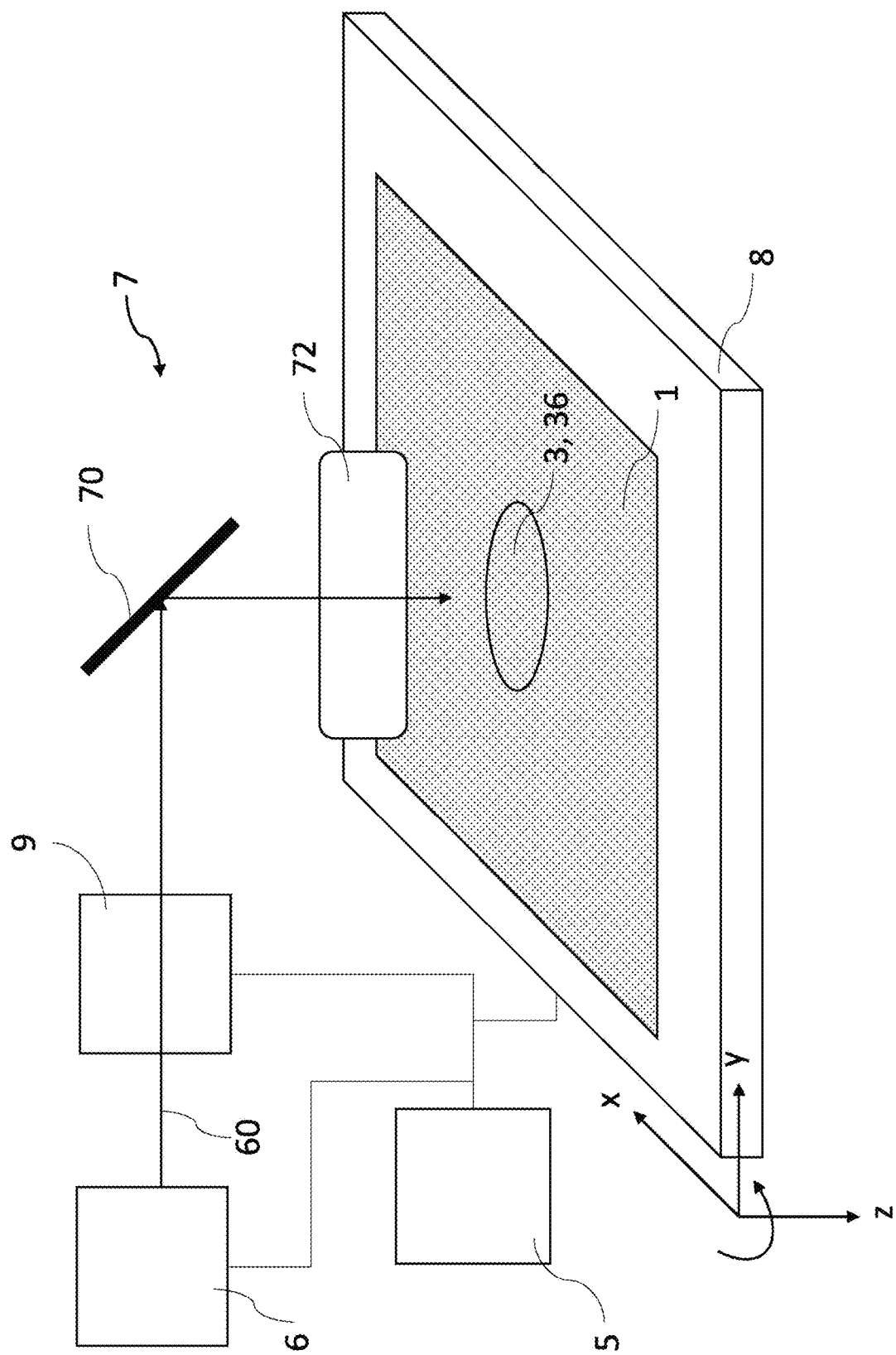
FIG. 10 shows a device for separating ultrathin glass according to some embodiments.

FIG. 10 shows a setup for carrying out the method. The laser beam 60 of the ultrashort pulse laser 6 is directed onto the ultrathin glass 1 by a beam-shaping optical unit 9 and by an optional mirror 70. The beam-shaping optical unit 9 may be, for example, a diffractive optical element or an axicon, which generates a non-diffractive laser beam 60 from a Gaussian laser beam 60. In the present example, the laser beam 60 is directed in the direction of the ultrathin glass 1 by the mirror 70 and focused onto or into the ultrathin glass 1 by a focusing optical unit 72. In this case, the focusing unit 7 may also contain a multiplicity of focusing optical units 1, if the laser beam 60 were intended to be divided into a multiplicity of parallel-running partial laser beams by a beam splitter (not shown), or may also contain only one focusing optical unit 72 for all partial beams. The laser beam 60 causes material modifications 3 in the ultrathin glass 1. In particular, the beam cross section of the laser beam remains unchanged by the mirror 70 and the focusing optical unit 72.

In this case, the feed device 8 can move the ultrathin glass under the laser beam 60 with a feed, such that the laser beam 60 introduces material modifications 3 along the desired separating line. In particular, the feed device may be configured to rotate the ultrathin glass 1 about the z-axis, or about the beam propagation direction, such that the long axis of the beam cross section perpendicular to the beam propagation direction is always tangential to the desired separating line, in order to thus bring about crack propagation along the separating line.

For this purpose, the feed device 8 may be connected to a control device 5, the control device 5 transforming the user commands of a user of the device into control commands for the feed device 8. In particular, predefined cutting patterns may be stored in a memory of the control device 5 and the processes may be automatically controlled by the control device 5.

The control device 5 may also be connected to a rotator, the rotator being able to rotate the beam-shaping optical unit 9 about the beam propagation direction of the laser beam 60, with the result that the mapping of the beam shape on the ultrathin glass appears in rotated form. In this way, the long axis of the beam cross section can be guided along the separating line in order to bring about the formation of cracks along the separating line. In this case, it suffices if the feed device 8 is merely an XYZ table, or an XY table.

The control device 5 may in particular also be connected to the laser 6. In this case, the control device 5 can set the laser pulse energy of the laser pulses of the laser 6, such that, in conjunction with the respective beam positions, provided by the feed device 8, the laser intensity is for example increased in order to bring about a change in direction of the crack propagation. In particular, the control device 5 may also be connected to all of the aforementioned components and may thus coordinate the material processing.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Ultrathin glass
10 First ultrathin glass half
12 Second ultrathin glass half
2 Separating line
20 Separating edge
3 Material modification
30 Material modification region
32 Crack
34 Boundary line
36 Material modification cross section
38 Long axis
4 Beam cross section
40 Boundary line
41 Principal order
42 Long axis
43 Secondary order
44 Focal zone
46 Longitudinal extent
48 Beam profile
5 Control device
6 Laser
60 Laser beam
7 Focusing unit
70 Mirror
72 Focusing optical units
8 Feed device
9 Beam-shaping optical unit
D Thickness of the ultrathin glass
FZ Tensile force

The invention claimed is:

1. A method for separating a glass using laser pulses of a pulse laser, the method comprising:
    focusing the laser pulses into the glass such that a resulting focal zone is elongated in a beam direction and extends over an entire thickness of the glass, wherein a laser beam formed by the laser pulses have a non-radially symmetric beam cross section perpendicular to a beam propagation direction, and wherein secondary maxima situated nearest to a principal maximum of the laser beam are positioned on an axis perpendicular to a long axis of the non-radially symmetric beam cross section and have an intensity of more than 17% relative to a maximum intensity,
    introducing material modifications into the glass along a separating line using the laser pulses focused into the glass, and
    separating the glass along the separating line.

2. The method according to claim 1, wherein the separating step comprises applying a thermal stress, and/or applying a mechanical force, and/or etching by using at least one wet-chemical solution.

3. The method according to claim 1, wherein the separating step comprises repeatedly passing the laser pulses over the separating line while introducing the laser pulses of the pulse laser, wherein laser parameters of the pulse laser are kept constant for all passes and correspond to laser parameters used for initial introduction of the material modifications.

4. The method according to claim 1, wherein a length of the focal zone elongated in the beam direction is longer than twice or ten times of the thickness of the glass.

5. The method according to claim 1, wherein the laser beam formed by the laser pulses is a quasi non-diffractive laser beam, at least in the focal zone elongated in the beam direction.

6. The method according to claim 1, wherein the long axis of the non-radially symmetric beam cross section has a vanishing intensity.

7. The method according to claim 1, wherein the long axis of the non-radially symmetric beam cross section has a non-vanishing intensity, and has an interference contrast of less than 0.9.

8. The method according to claim 1, wherein the material modification has a non-radially symmetric material modification cross section, and/or
    the long axis of the non-radially symmetric material modification cross section is oriented along the separating line.

9. The method according to claim 1, wherein each material modification is introduced into the glass by a single laser pulse or by a single burst of laser pulses.

10. The method according to claim 1, wherein all of the material modifications are introduced into the glass in a single pass of a laser beam formed by the laser pulses along the separating line, and the glass is then separated by application of a tensile force in the separating step.

11. The method according to claim 1, wherein a distance between the material modifications is greater than twice, or four times, or ten times of a long axis of a non-radially symmetric material modification cross section.

12. The method according to claim 1, wherein
    the laser pulses have a wavelength of between 300 nm and 2000 nm, and/or
    the laser pulses have a pulse duration that is shorter than 1 ns, and/or a pulse energy of each laser pulse is less than 100 µJ, and/or a repetition rate of a laser beam formed by the laser pulses is less than 1 MHZ, and/or when a plurality of laser pulses are emitted in a pulse train, the pulse train comprises between two and six laser pulses, and a repetition rate within a pulse train is between 100 MHz and 50 GHz.

13. The method according to claim 1, wherein the glass is thinner than 1000 µm.

14. The method according to claim 1, wherein a laser pulse is split by a beam splitter optical unit, and at least two material modifications are introduced simultaneously into the glass.

* * * * *